(12) United States Patent
Wallace (10) Patent No.: US 8,559,793 B2
(45) Date of Patent: Oct. 15, 2013

(54) SYNCHRONOUS DATA TRACKS IN A MEDIA EDITING SYSTEM

(75) Inventor: Ron Wallace, Lexington, MA (US)

(73) Assignee: Avid Technology, Inc., Burlington, MA (US)

( * ) Notice: Subject to any disclaimer, the term of this patent is extended or adjusted under 35 U.S.C. 154(b) by 146 days.

(21) Appl. No.: 13/116,744

(22) Filed: May 26, 2011

(65) Prior Publication Data

US 2012/0301112 A1 Nov. 29, 2012

(51) Int. Cl.
*H04N 5/76* (2006.01)

(52) U.S. Cl.
USPC .......................................... 386/278; 386/280

(58) Field of Classification Search
None
See application file for complete search history.

(56) References Cited

U.S. PATENT DOCUMENTS

| | | |
|---|---|---|
| 4,538,188 A | 8/1985 | Barker et al. |
| 4,685,003 A | 8/1987 | Westland |
| 4,746,994 A | 5/1988 | Ettlinger |
| 5,012,334 A | 4/1991 | Etra |
| 5,045,940 A | 9/1991 | Peters et al. |
| 5,097,351 A | 3/1992 | Kramer |
| 5,196,933 A | 3/1993 | Henot |
| 5,214,528 A | 5/1993 | Akanabe et al. |
| 5,237,648 A | 8/1993 | Mills et al. |
| 5,267,351 A | 11/1993 | Reber et al. |
| 5,274,758 A | 12/1993 | Beitel et al. |
| 5,307,456 A | 4/1994 | MacKay |
| 5,317,732 A | 5/1994 | Gerlach, Jr. et al. |
| 5,355,450 A | 10/1994 | Garmon et al. |
| 5,390,138 A | 2/1995 | Milne et al. |
| 5,404,316 A | 4/1995 | Klingler et al. |
| 5,428,731 A | 6/1995 | Powers, III |
| 5,442,744 A | 8/1995 | Piech et al. |
| 5,467,288 A | 11/1995 | Fasciano et al. |
| 5,488,433 A | 1/1996 | Washino et al. |
| 5,489,947 A | 2/1996 | Cooper |
| 5,493,568 A | 2/1996 | Sampat et al. |

(Continued)

FOREIGN PATENT DOCUMENTS

| | | |
|---|---|---|
| EP | 0403118 | 12/1990 |
| EP | 0469850 | 2/1992 |

(Continued)

OTHER PUBLICATIONS

Bulterman, D.C.A. et al., "GRiNS: A Graphical Interface for creating and playing SMIL Documents", Computer Networks & ISDN Systems, Sep. 30, 1998, North Holland Publishing, Amsterdam, NL, vol. 30, NR. 1-7, pp. 519-529.

(Continued)

*Primary Examiner* — Huy T Nguyen
*Assistant Examiner* — Eileen Adams
(74) *Attorney, Agent, or Firm* — Oliver Strimpel (57) ABSTRACT

A media editing system provides an editor with full visibility and editing capability for synchronous data that is adjunct to audio and video. The data tracks include one or more streams of data packets, each stream being of a particular data type. Synchronous data tracks are displayed on the timeline, facilitating data track editing independent of the associated media tracks. The UI also enables selective playback and export of the data tracks along with the corresponding video and audio. The system also enables data streams to be filtered and combined. Data from the data tracks can be extracted and imported into a media asset management system, enabling the data to be searched.

16 Claims, 11 Drawing Sheets

(56) References Cited

U.S. PATENT DOCUMENTS

| | | | |
|---|---|---|---|
| 5,513,306 A | 4/1996 | Mills et al. | |
| 5,515,490 A | 5/1996 | Buchanan et al. | |
| 5,534,942 A | 7/1996 | Beyers et al. | |
| 5,537,141 A | 7/1996 | Harper et al. | |
| 5,537,157 A | 7/1996 | Washino et al. | |
| 5,539,869 A | 7/1996 | Spoto et al. | |
| 5,541,662 A | 7/1996 | Adams et al. | |
| 5,561,457 A | 10/1996 | Cragun et al. | |
| 5,568,275 A | 10/1996 | Norton et al. | |
| 5,577,190 A | 11/1996 | Peters | |
| 5,584,006 A | 12/1996 | Reber et al. | |
| 5,585,858 A | 12/1996 | Harper et al. | |
| 5,592,602 A | 1/1997 | Edmunds et al. | |
| 5,613,057 A | 3/1997 | Caravel | |
| 5,617,146 A | 4/1997 | Duffield et al. | |
| 5,619,636 A | 4/1997 | Sweat et al. | |
| 5,623,308 A | 4/1997 | Civanlar et al. | |
| 5,652,714 A | 7/1997 | Peterson et al. | |
| 5,659,790 A | 8/1997 | Kim et al. | |
| 5,659,792 A | 8/1997 | Walmsley | |
| 5,659,793 A | 8/1997 | Escobar et al. | |
| 5,664,216 A | 9/1997 | Blumenau | |
| 5,680,619 A | 10/1997 | Gudmundson et al. | |
| 5,682,326 A | 10/1997 | Klingler et al. | |
| 5,684,963 A | 11/1997 | Clement | |
| 5,712,953 A | 1/1998 | Langs | |
| 5,724,605 A | 3/1998 | Wissner | |
| 5,752,029 A | 5/1998 | Wissner | |
| 5,754,851 A | 5/1998 | Wissner | |
| 5,760,767 A | 6/1998 | Shore et al. | |
| 5,764,275 A | 6/1998 | Lappington et al. | |
| 5,767,846 A | 6/1998 | Nakamura et al. | |
| 5,781,435 A | 7/1998 | Holroyd et al. | |
| 5,801,685 A | 9/1998 | Miller et al. | |
| 5,822,019 A | 10/1998 | Takeuchi et al. | |
| 5,826,102 A | 10/1998 | Escobar et al. | |
| 5,852,435 A | 12/1998 | Vigneaux et al. | |
| 5,860,073 A | 1/1999 | Ferrel et al. | |
| 5,861,881 A | 1/1999 | Freeman et al. | |
| 5,889,514 A | 3/1999 | Boezeman et al. | |
| 5,892,506 A | 4/1999 | Hermanson | |
| 5,892,507 A | 4/1999 | Moorby et al. | |
| 5,905,841 A | 5/1999 | Peters et al. | |
| 5,907,366 A | 5/1999 | Farmer et al. | |
| 5,910,825 A | 6/1999 | Takeuchi | |
| 5,926,613 A | 7/1999 | Schaffer | |
| 5,930,445 A | 7/1999 | Peters et al. | |
| 5,946,445 A | 8/1999 | Peters et al. | |
| 5,969,716 A | 10/1999 | Davis et al. | |
| 5,977,962 A | 11/1999 | Chapman et al. | |
| 5,978,648 A | 11/1999 | George et al. | |
| 5,982,445 A | 11/1999 | Eyer et al. | |
| 5,995,951 A | 11/1999 | Ferguson | |
| 5,999,173 A | 12/1999 | Ubillos | |
| 6,016,362 A | 1/2000 | Kato et al. | |
| 6,037,932 A | 3/2000 | Feinleib | |
| 6,038,573 A | 3/2000 | Parks | |
| 6,058,236 A | 5/2000 | Peters et al. | |
| 6,081,262 A | 6/2000 | Gill et al. | |
| 6,091,407 A | 7/2000 | Boetje et al. | |
| 6,092,122 A | 7/2000 | Liu et al. | |
| 6,118,444 A | 9/2000 | Garmon et al. | |
| 6,195,497 B1 | 2/2001 | Nagasaka et al. | |
| 6,199,082 B1 | 3/2001 | Ferrel et al. | |
| 6,201,924 B1 | 3/2001 | Crane et al. | |
| 6,212,527 B1 | 4/2001 | Gustman | |
| 6,230,173 B1 | 5/2001 | Ferrel et al. | |
| 6,236,395 B1 | 5/2001 | Sezan et al. | |
| 6,243,087 B1 | 6/2001 | Davis et al. | |
| 6,249,280 B1 | 6/2001 | Garmon et al. | |
| 6,262,723 B1 | 7/2001 | Matsuzawa et al. | |
| 6,262,724 B1 | 7/2001 | Crowe et al. | |
| 6,330,004 B1 | 12/2001 | Matsuzawa et al. | |
| 6,353,461 B1 | 3/2002 | Shore et al. | |
| 6,400,378 B1 | 6/2002 | Snook | |
| 6,404,978 B1 | 6/2002 | Abe | |
| 6,411,725 B1 | 6/2002 | Rhoads | |
| 6,426,778 B1 | 7/2002 | Valdez, Jr. | |
| 6,430,355 B1 | 8/2002 | Nagasawa | |
| 6,476,828 B1 | 11/2002 | Burkett et al. | |
| 6,484,199 B2 | 11/2002 | Eyal | |
| 6,489,969 B1 | 12/2002 | Garmon et al. | |
| 6,544,294 B1 | 4/2003 | Greenfield et al. | |
| 6,546,405 B2 | 4/2003 | Gupta et al. | |
| 6,553,142 B2 | 4/2003 | Peters | |
| 6,564,263 B1 | 5/2003 | Bergman et al. | |
| 6,597,375 B1 | 7/2003 | Yawitz | |
| 6,618,547 B1 | 9/2003 | Peters et al. | |
| 6,654,933 B1 | 11/2003 | Abbott et al. | |
| 6,715,126 B1 | 3/2004 | Chang et al. | |
| 7,725,812 B1 | 5/2010 | Balkus et al. | |
| 7,930,624 B2 | 4/2011 | Phillips et al. | |
| 2002/0188628 A1 | 12/2002 | Cooper et al. | |
| 2003/0018609 A1 | 1/2003 | Phillips et al. | |
| 2004/0268224 A1 | 12/2004 | Balkus et al. | |
| 2005/0120127 A1 | 6/2005 | Bradley et al. | |
| 2008/0298768 A1* | 12/2008 | Isobe et al. | 386/52 |
| 2009/0282080 A1* | 11/2009 | Schlossberg et al. | 707/104.1 |
| 2011/0064146 A1* | 3/2011 | Chen et al. | 375/240.26 |
| 2011/0154290 A1 | 6/2011 | Kelly | |
| 2011/0191661 A1 | 8/2011 | Phillips et al. | |

FOREIGN PATENT DOCUMENTS

| | | |
|---|---|---|
| EP | 0526064 | 2/1993 |
| EP | 0564247 | 10/1993 |
| EP | 0592250 | 4/1994 |
| EP | 0596823 | 5/1994 |
| EP | 0613145 | 8/1994 |
| EP | 0689133 | 10/1995 |
| EP | 0706124 | 4/1996 |
| GB | 2336025 | 10/1999 |
| WO | WO88/07719 | 10/1988 |
| WO | WO93/21636 | 10/1993 |
| WO | WO94/03897 | 2/1994 |
| WO | WO94/29868 | 12/1994 |
| WO | WO96/26600 | 8/1996 |
| WO | WO96/31829 | 10/1996 |
| WO | WO96/36007 | 11/1996 |
| WO | WO97/12342 | 4/1997 |
| WO | WO97/37497 | 10/1997 |
| WO | WO98/04984 | 2/1998 |
| WO | WO99/52045 | 10/1999 |
| WO | WO00/73875 | 12/2000 |

OTHER PUBLICATIONS

Candan, K. Selcuk, et al., "CHIMP: A Framework for Supporting Distributed Multimedia Document Authoring and Presentation", ACM Multimedia 96, Boston, MA, pp. 329-340.

Fahmi, H. et al., "Distributed framework for real-time multimedia object communication", Object-Oriented Real-Time Distributed Computing 2000, ISORC 2000, Proceedings, Third IEEE International Symposium, Newport, CA, USA, Mar. 15-17, 2000, Los Alamitos, CA, USA, IEEE Computer Society, pp. 252-259.

Mines, Robert F. et al., "DAVE: A Plug and Play Model for Distributed Multimedia Application Development", ACM Multimedia 94, San Francisco, CA, pp. 59-66.

Nicol, John R., et al., "How the Internet Helps Build Collaborative Multimedia Applications", Communications of the ACM, Jan. 1999, vol. 42, No. 1, pp. 79-85.

Sauer, S. et al., "Extending UML for modeling of multimedia applications", Visual Languages, 1999, Proceedings 1999 IEEE Symposium, Tokyo, JP, Sep. 13-16, 1999, Los Alamitos, CA, USA, IEEE Computer Society, pp. 80-87.

AAF Specification Version 1.0 DR4, 2000, pp. i-181.

Ackermann, Phillipp, "Design and Implementation of an Object-oriented Media Composition Framework", Int'l, Computer Music Conference, 1994.

Agnew, J.N. et al., "The Right Tool for the Job: A Quest for the Perfect Authoring Package", Proceedings of SIGDOC '92: 10$^{th}$ Annual ACM Conference on Systems Documentation, Oct. 1992, Ottawa, Ontario, Canada, pp. 253-258.

(56) References Cited

OTHER PUBLICATIONS

Authorware Users Guide, Macromedia Inc., 1992, pp. 8-9, 12-13, 15, 17, 20, 25, 28-31, 36-37, 43, 46-47, 115, 178-179, 191, 232, 242, 301-302.
Baecker, R et al., "A Multimedia System for Authoring Motion Pictures", ACM Multimedia 1996, pp. 31-42.
Blakowski, Gerold, et al., "Tools for Specifying and Executing Synchronized Multimedia Presentations", Proc. $2^{nd}$ Int'l. Workshop on OS for Digital Audio Video, Nov. 18-19, 1991, pp. 271-279.
The Brughetti Corporation, Product Information for Pure Image Creator, SLICE Transition Maker and AIR Playout Manager, 1994, (11 pages).
Buchanan, M. Cecelia et al., "Automatic Temporal Layout Mechanisms", Proc. ACM Multimedia 1993, pp. 341-350.
Buchanan, M. Cecelia et al., "Specifying Temporal Behavior in Hypermedia Documents", ECHT '92, pp. 262-271.
Buford, John F., "Integrating Object-Oriented Scripting Languages with HyTime", from Proceedings of ICMCS 1994 IEEE, pp. 1-10.
Bulterman, Dick C.A. et al., "Multimedia Authoring Tools: State of the Art and Research Challenges", LNCS 1000, 1995, pp. 1-17.
Chiu, Patrick et al., A Dynamic Grouping Technique for Ink and Audio Notes, USIT-98, San Francisco, CA 1998 ACM, pp. 195-202.
Chiueh, Tzi-cker, et al., Zodiac: A History-Based Interactive Video Authoring System; ACM Multimedia '98, Bristol, UK, 1998 ACM, pp. 435-443.
Chua, Tat-Seng et al., "A Video Retrieval and Sequencing System", ACM Transactions on Information Systems, vol. 13, No. 4, Oct. 1995, pp. 373-407.
"The Coming Revolution", Communications of the ACM, Jul. 1989, vol. 32, No. 7, pp. 794-901.
Csinger, Andrew et al., "AI Meets Authoring: User Models for Intelligent Multimedia, Artificial Intelligence review, special issue on user modeling", 8, pp. 447-468, 1995.
Drapeau, George D. et al., "MAEstro—A Distributed Multimedia Authoring Environment", USENIX, Summer 1991, pp. 315-328.
Drapeau, George D., "Synchronization in the MAEstro Multimedia Authoring Environment", ACM Multimedia 1993, pp. 331-340.
Davenport, Gloriana et al., "Cinematic Primitives for Multimedia", 1991 IEEE, Jul. 7, 1991, pp. 67-74.
The Electronic Scrapbook: Towards an Intelligent Home-Video Editing System, by Amy Susan Bruckman, Sep. 1991, video Mosaic: Laying Out Time in a Physical Space.
Eun, Seong Bae et al., "Specification of Multimedia Composition and A Visual Programming Environment", Proceeding of the first ACM Int'I. Conference on Multimedia, pp. 167-173, 1993.
Gephard, C., Der Widersenstigen Zahmung: Computer & Video Radio Fernsehen Electronik, vol. 44, No. 1, Jan. 1, 1995, Berlin, DE.
Gibbs, Simon, "Composition Multimedia and Active Objects", in Proc. OOPSLA 1991, pp. 1-16.
Gibbs, Simon, "Data Modeling of time-Based Media", SIGMOD'94, 1994 ACM, pp. 91-102.
Gibbs, Simon, "Video Nodes and Video Webs: Uses of Video in Hypermedia", Proc. ACM Conf. on Hypertext, 1992, p. 3.
Girgensohn, Andreas et al., "A Semi-automatic Approach to Home Video Editing", UIST '00, San Diego, CA, 2000 ACM, CHI Letters vol. 2, 2, pp. 81-89.
Gruenette R., "Authorware and IconAuthor", CD-ROM Professional, vol. 8, No. 10, Oct. 1995, pp. 81-89.
Hardman, H., "New Authoring Tools for Windows", BYTE, vol. 18, No. 9, Aug. 1993, pp. 153-156.
Hardman, Lynda et al., "Authoring Interactive Multimedia: Problems and Prospects", CWI Quarterly, vol. 7(1) 1994, pp. 47-66.
Hardman, Lynda et al., "Structured Multimedia Authoring", ACM Multimedia 1993, pp. 283-289.
Herman, I. et al., "MADE: A Multimedia Application Development Environment", CWI Quarterly, vol. 7(1) 1994, pp. 27-46.
Hirata, Kyoji, et al., "Content-Oriented Integration in Hypermedia Systems", Hypertext '86, $7^{th}$ ACM Conf. On Hypertext, Conf. 7, Mar. 1996, pp. 11-21.
Hirzalla, Nael, et al., "A temporal Model for Interactive Multimedia Scenarios", in IEEE Multimedia, vol. 2, No. 3, Fall 1995, pp. 24-31.
Hudson, Scott E. et al., "The Walk-Through Approach to Authoring Multimedia Documents", Multimedia '94, 1994 ACM, pp. 173-180.
Hung, Yung-Chen, "A Hypervideo System Generator", Software Practice and Experience, vol. 17(11), Nov. 1997, pp. 1263-1281.
Koefel, J.F. et al., "Improving Visual Programming Languages for Multimedia Authoring", Educational Multimedia and Hypermedia Annula, 1993, Proceeding of Ed-Media 93-World on Educational Multimedia and Hypermedia, Jun. 1993, Orlando, FL, pp. 286-293.
Kurlander, David et al., "A Visual Language for Browsing, Undoing, and Redoing Graphical Interface Commands", in Visual Languages and Visual Programming, 1990, pp. 257-275.
Mackay, W.E. et al., "Video Mosaic: Laying Out Time in a Physical Space", Proceedings of Multimedia '94, San Francisco, CA, ACM, 8 pages.
Mackay, W.E. et al., "Virtual Video Editing in Interactive Multimedia Applications", Communications of the ACM, Jul. 1989, vol. 32, No. 7, pp. 802-810.
Macromind Mediamaker, Macromind Inc., 1990, pp. 129, 165 and 166.
Matthews, James et al., "VideoScheme: A Programmable Video Editing System for Automation and Media Recognition", ACM Multimedia 1993.
Ohanian, Tom, "The Avid 1 Media Composer", Int'l. Broadcast Engineer, Jan. 1991, pp. 22-23.
Open Media Framework, OMF Interchange Specification, Avid Technology, Inc., Version 2.0, Nov. 29, 1995, pp. i-245.
Pazandak, Paul et al., "A Multimedia Temporal Specification Model and Language", Technical Report 94-33, University of Minnesota, 1994.
Ryan, Mark et al., "A Development Process for Large Multimedia Titles", 1994 ACM, pp. 126-138.
Sack, Warren et al., "IDIC: Assembling Video Sequences from Story Plans and Content Annotations", In: Proceedings of IEEE International Conf. on Multimedia Computing and Systems in Boston, MA, IEEE Computer Science Society Press, pp. 30-36, 1994.
Schleicher, Stephen, "How to Create Web Markers in Premiere 6", Digital Video Editing, Digital Media Online, 2001.
"Schneller Zugrigg: Video Machine Von Fast", Radio Fernshen Elektonik, vol. 44, No. 11, Nov. 1, 1995, Berlin, DE.
Siocchi, A. et al., "The Integrator: A Prototype for Flexible Development of Interactive Digital Applications", Interactive Multimedia, vol. 2, No. 3, 1993, pp. 5-26.
Tonomura, Yoshinobu, "Video Handling Based on Structured Information for Hypermedia Systems", Proceedings of the Int'l Conference of Multimedia Information Systems, Jan. 1991, pp. 333-334.
Ueda, Hirotada et al., "Automatic Scene Separation and Tree Structure GUI for Video Editing", ACM Multimedia 96, Boston, MA, 1996 ACM, pp. 405-406.
Ueda, Hirotada et al., "Automatic Structure Visualization for Video Editing", Interchi '93, 1993 ACM, Apr. 24-29, 1993, pp. 137-141; 545-546.
Uedo, Hirotada et al., Impact: An Interactive Natural-Motion-Picture Dedicated Multimedia Authoring System, 1991 ACM, pp. 343-350.
Ueda, Hirotada et al., "Impact: Interactive Motion Picture Authoring System for Creative Talent", 1993 ACM, p. 525.
Van der Sluis, Ielka et al., "Enriching Textual Documents with Timecodes from Video Fragments", In: Proceedings RIAO 2000 Content-Based Multimedia Information Access, Paris, Apr. 2000, pp, 431-440.
Wahl, Thomas et al,, "Representing Time in Multimedia Systems", Proc. IEEE Int'l Conf. On Multimedia 1994, pp. 538-543.
Wahl, Thomas et al., "Tiempo: Temporal Modeling and Authoring of Interactive Multimedia", Proc. Int'l Conf. of Multimedia, 1995, pp. 274-277.
Weiss, Ron et al., "Content-Based Access to Algebraic Video", Proceedings Int'l Conf. on Multimedia Computing and Systems, Boston, MA, May 1994, pp. 140-151.
Zhang et al., "Video parsing, retrieval and browsing: an integrated and content-based solution", Proceedings of the third ACM Int'l Conference on Multimedia, published 1995, p. 15-25, renumbered in printout copy as p. 1-18.

\* cited by examiner

Composite

Timeline

SYNCHRONOUS DATA TRACKS IN A MEDIA EDITING SYSTEM

BACKGROUND

In systems for editing and producing video and audio, it is often useful to carry various kinds of data that are adjunct to the audio and video signal data. Some of these data are associated with a video or audio sequence as a whole, or associated with a segment, and are not synchronous. Examples include descriptive metadata, such as information about the people involved in the production, date and location, as well as structural metadata, such as image format/type (e.g., HD, SD) and bit rate. However an increasing range of information in the form of data streams that are time-synchronized with the audio and video content is also being generated. This information is distinct from the audio and video portions of the signal, and represents additional information pertaining to the production and/or subject matter of the material.

In existing media editing and production systems, time-synchronous adjunct data are usually embedded within the audio or video signal. In digital video broadcasts, the data is often placed in the ancillary portion of the signal. In file-based media, such as those generated by cameras, disk recorders, video servers, and other video or audio acquisition and playback devices, the data is present in various forms within the media files, often as embedded portions of the video frames.

Such schemes for handling time-synchronous adjunct data streams limit the ability of editors to edit or otherwise manipulate the data streams independently of the picture and audio tracks.

SUMMARY

In general, the methods, systems, and computer program products described herein enable time-synchronous data to be represented as distinct entities that are independently editable from the program picture and sound. They further enable the time-synchronous data to be acquired and converted into a flexible format, extracted into indexed asset management systems for analysis, aggregation, and search, and to be accurately created, edited, and played back in sync with picture and sound.

In general, in one aspect, a method of editing a time-based media composition using a media editing software application, wherein the composition includes at least one media track and at least one data track, includes: displaying a timeline representing a current state of the media composition, wherein the timeline includes the at least one media track and the at least one data track, wherein the data track references at least one data stream comprising a stream of data packets, wherein each of the data packets occupies a unique time address corresponding to a media element on the media track; enabling a user of the media editing software application to perform a first editing operation to the time-based media composition, wherein the first editing operation is applied to both the at least one media track and the at least one data track, thereby maintaining temporal synchrony between the at least one media track and the at least one data track; and enabling the user of the media editing software application to perform a second editing operation to the media composition, wherein the second editing operation is applied to only one of the at least one media track and the at least one data track, thereby altering a temporal relationship between at least a portion of the at least one media track and the at least one data track.

Various embodiments include one or more of the following features. At least one of the first and second editing operations includes moving at least one boundary of a segment of the composition. At least one of the first and second editing operations includes altering a temporal location within the composition of a segment of the composition. The time-based media composition is a video composition. The media element is a video frame. The time-based media composition is an audio composition. One of the data tracks references text data. The text data is one of the set consisting of closed captions, open captions, subtitles, and teletext. One of the data tracks references film metadata and/or camera data. The method further enables a user to combine data referenced by at least one data track and at least one media track into a combination media stream, and to output the combination media stream. The at least one data track includes a plurality of data streams, and the method further enables a user to select and output a subset of the plurality of data streams. Further enabling a user to convert data referenced by the at least one data track into a form that is searchable by a media asset management system, and storing the converted data in a database.

In general, in another aspect, a computer program product includes: a computer-readable medium with computer program instructions encoded thereon, wherein the computer program instructions, when processed by a computer, instruct the computer to perform a method of editing a time-based media composition, wherein the composition includes at least one media track and at least one data track, the method comprising: displaying a timeline representing a current state of the media composition, wherein the timeline includes the at least one media track and the at least one data track, wherein the data track references at least one data stream comprising a stream of data packets, wherein each of the data packets occupies a unique time address corresponding to a media element on the media track; enabling a user of the computer to perform an editing operation to the time-based media composition, wherein the editing operation is applied to both the at least one media track and the at least one data track, thereby maintaining temporal synchrony between the at least one media track and the at least one data track; and enabling the user of the computer to perform an editing operation to the media composition, wherein the editing operation is applied to only one of the at least one media track and the at least one data track, thereby altering a temporal relationship between at least a portion of the at least one media track and the at least one data track.

In general, in a further aspect, a system for editing a time-based media composition, the system including: a memory for storing computer-readable instructions; and a processor connected to the memory, wherein the processor, when executing the computer-readable instructions, causes the media composition system to perform a method of editing a media composition, wherein the composition includes at least one media track and at least one data track, the method comprising: displaying a timeline representing a current state of the media composition, wherein the timeline includes the at least one media track and the at least one data track, wherein the data track references at least one data stream comprising a stream of data packets, wherein each of the data packets occupies a unique time address corresponding to a media element on the media track; enabling a user to perform an editing operation to the time-based media composition, wherein the editing operation is applied to both the at least one media track and the at least one data track, thereby maintaining temporal synchrony between the at least one media track and the at least one data track; and enabling the user to perform an editing operation to the media composition, wherein the editing operation is applied to only one of the at least one media track and the at least one data track, thereby altering a temporal relationship between at least a portion of the at least one media track and the at least one data track.

In general, in still a further aspect a method of editing a video composition using a video editing software application, wherein the video composition includes at least one video track and at least two data tracks, the method including: displaying a timeline representing a current state of the video composition, wherein the timeline includes the at least one video track and the at least two data tracks, wherein each data track references at least one data stream comprising a stream of data packets, wherein each of the data packets occupies a unique time address corresponding to a frame time on the video track, and wherein each of the packets within a given stream are characterized by a common data type, and wherein each of a first data track and a second data track includes a data stream of a first data type; and enabling a user of the video editing software application to select one of the data stream of the first type from the first data track and the data stream of the first type from the second data track, wherein the selected data stream is selectively included in at least one of playback or export of the video composition.

DETAILED DESCRIPTION

Time-synchronous data pertaining to video and audio programs include descriptive, structural, and enhancement data. Types of time-synchronous data include, but are not limited to: closed and open captions; subtitles; teletext; film metadata, such as edgecodes, keycodes, and pull-down flags; timecodes; camera data, such as position, zoom, iris, and gain; location data, such as GPS coordinates; program description; 3D stereo parameters; aspect ratio conformance, such as Advanced Format Descriptor; and interactive television programming. Audio-specific examples include: gain, pan, and mixing parameters; MIDI data; and audio timecodes. A system for facilitating the editing of video programs with enhancement data is described in U.S. Pat. No. 7,930,624, entitled Editing Time-Based Media with Enhanced Content, which is incorporated herein by reference.

Figure 1:
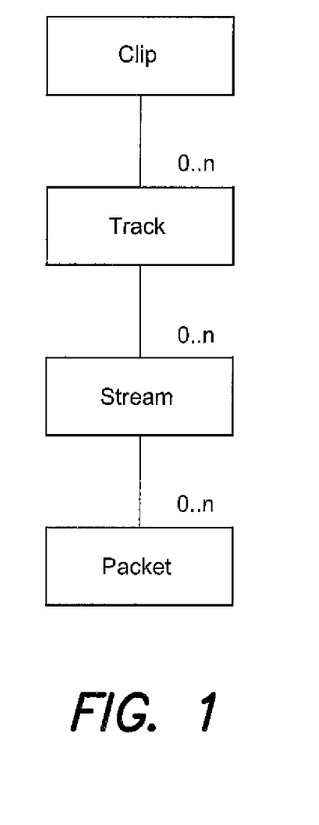
FIG. 1 shows a hierarchy of media data structures.
Figure 2:
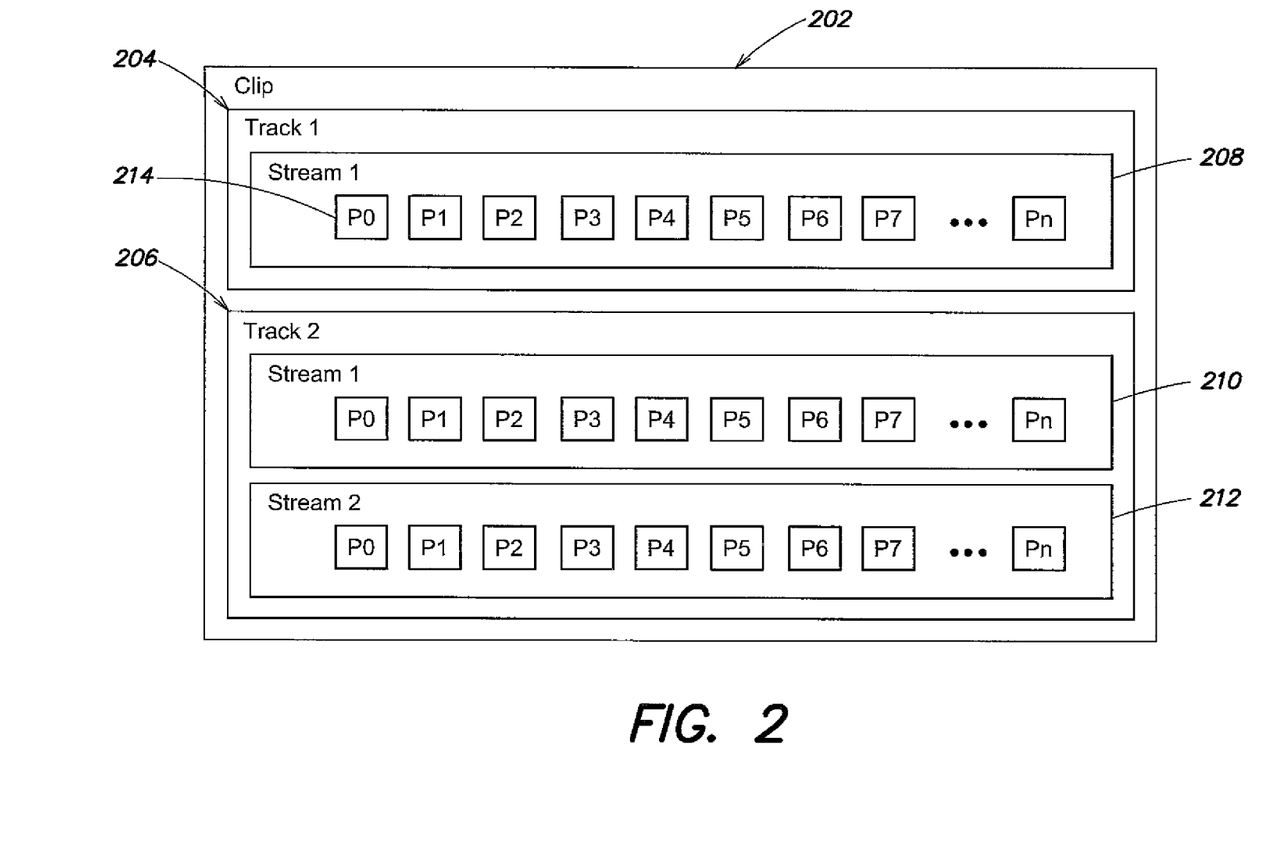
FIG. 2 shows a data hierarchy for a clip that includes data tracks.
Figure 3:
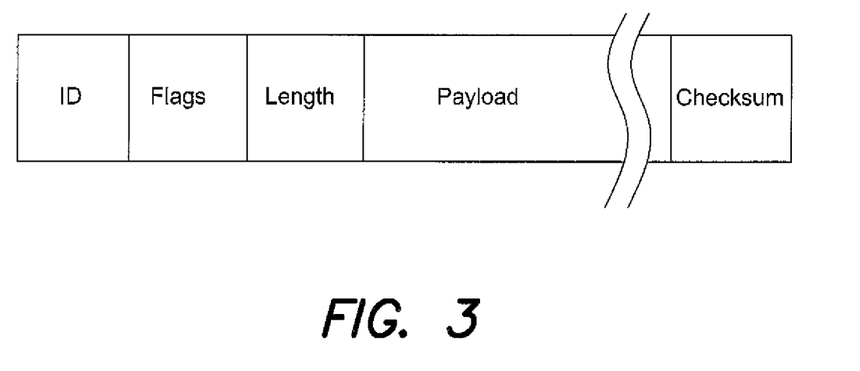
FIG. 3 is a diagram of a data packet format.

Time-synchronous data are organized into a hierarchy of data structures including clips, tracks, streams, and packets, as shown in FIG. 1. An example of the relationship between these elements is illustrated in FIG. 2. The figure shows single clip 202 containing two data tracks 204, 206. Track 204 contains one stream of data packets 208, and track 206 contains two streams 210, 212 of data packets, such as packet 214. In some schemes, a packet corresponds to an individual video or audio sample. The format of a packet is illustrated in FIG. 3. The ID includes an identifier of the type of data contained within the PAYLOAD portion of the packet. The length in bytes of the PAYLOAD portion is determined by the LENGTH field. FLAGS indicate if the data is located in a video ancillary data signal, and if it is, in what portion of the signal. CHECKSUM is a value computed from all of the bytes in the packet except the CHECKSUM field itself, and is used to verify the data integrity of the packet.

Figure 4:
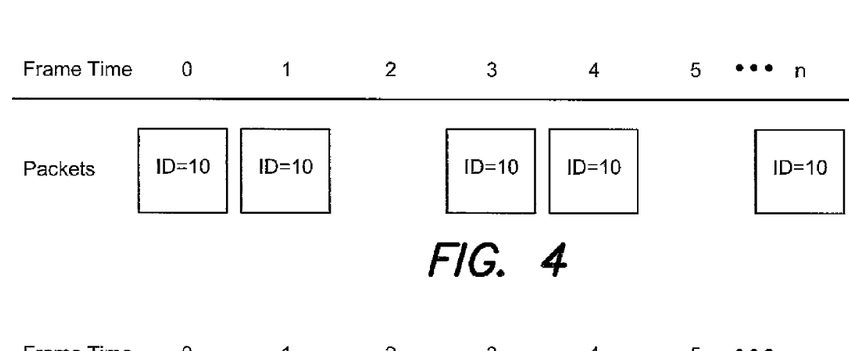
FIG. 4 illustrates a sparse data packet stream.

Data packets are organized into streams, each stream including only a single type of packet, i.e., corresponding to a single synchronous data type. Within each stream, each packet occupies a unique time address, which corresponds to a time interval of a video frame. Thus, there can be no more than one packet at a given frame address, but it is not necessary for each frame address in the range of frames in the content to be assigned a packet in the stream, as shown, for example in the sparse stream illustrated in FIG. 4. Since each of the packets in the stream represents only one data type, they all have the same ID values.

Figure 5:
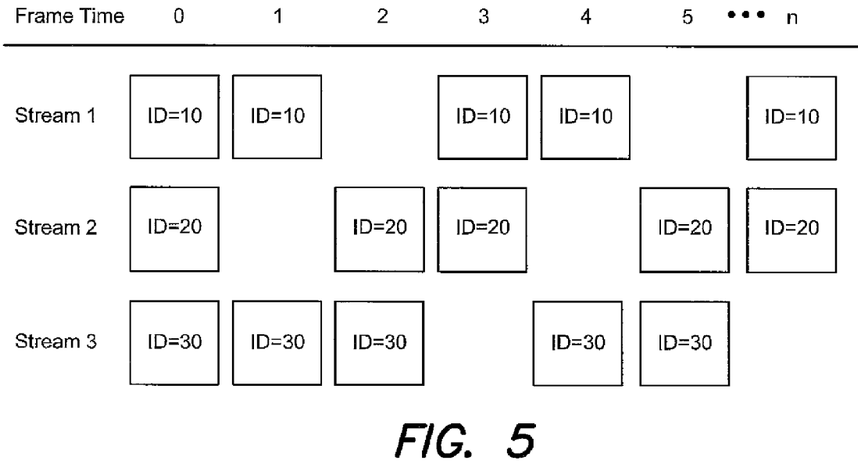
FIG. 5 illustrates a data track with three streams.

One or more streams are organized into tracks, in which each stream has the same time length, and each track includes no more than one stream of a given type (ID). FIG. 5 illustrates a track containing three streams. The number of streams in a track is limited by the total number of different ID type values, since a given type of stream may only appear once within a given track. The stream data for a track is typically stored in a separate file known as the stream file. The track data structure contains a reference to this file.

Figure 6:
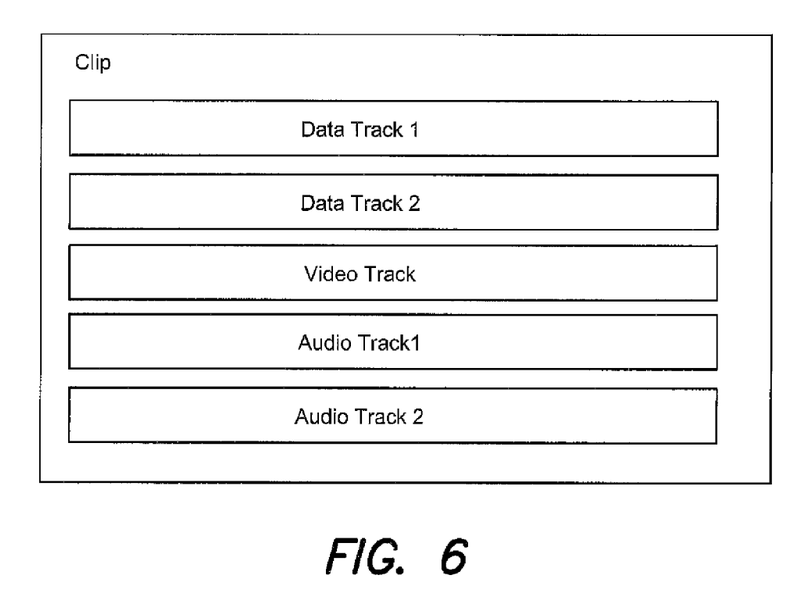
FIG. 6 is a diagrammatic representation of a clip with two data tracks, one video track, and two audio tracks.

Multiple data tracks are assembled into clips, with each track having the same duration and starting time address. Video and/or audio tracks are included in the clips, and the clip structure ensures that data streams are synchronized with each other and with audio and video content. FIG. 6 illustrates a clip with two data tracks, one video track, and two audio tracks.

Multiple clips are further arranged in a desired order into a sequence. In a sequence, any portion of a data track or data stream (accurate to a video frame time) can be selected and inserted. This enables the user of a digital media production system to alter the order and timing of the data in clips to create a new order and timing.

Figure 7:
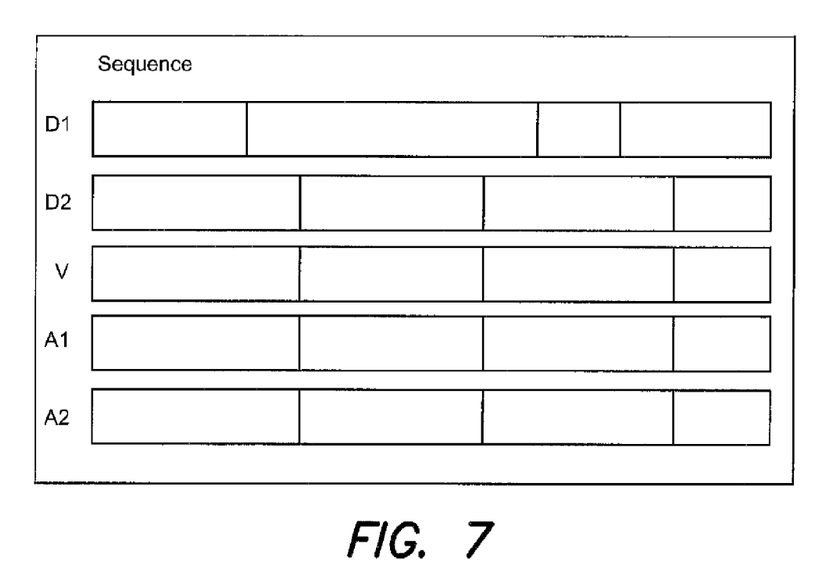
FIG. 7 shows a schematic of a sequence including two data tracks, one video track, and two audio tracks.

FIG. 7 shows a schematic representation of a sequence of four clips containing two data tracks, one video track, and two audio tracks. In data track D2, the edit points are all aligned with the video and audio edit points. However, it is possible for each data track to have its own independent set of edit points that do not have to align with the edit points of any other data, video, or audio track. Data track D1 illustrates this principle. As an example, such non-aligned cuts are used in video production, when an audio track cuts away to the incoming clip before the video does so, giving the viewer cues to anticipate the incoming scene. Another example occurs in the tuning of closed caption data, in which the closed caption edit points are slipped in order to optimize the ability to read the captions. The need to slip captions may arise, for example, as a result of live captioning when there is a variable delay between the spoken word and captions, depending on the material and the ability of the captioner. By slipping captions out of their original relationship, proper timing is achieved and the problem is corrected.

Figure 8:
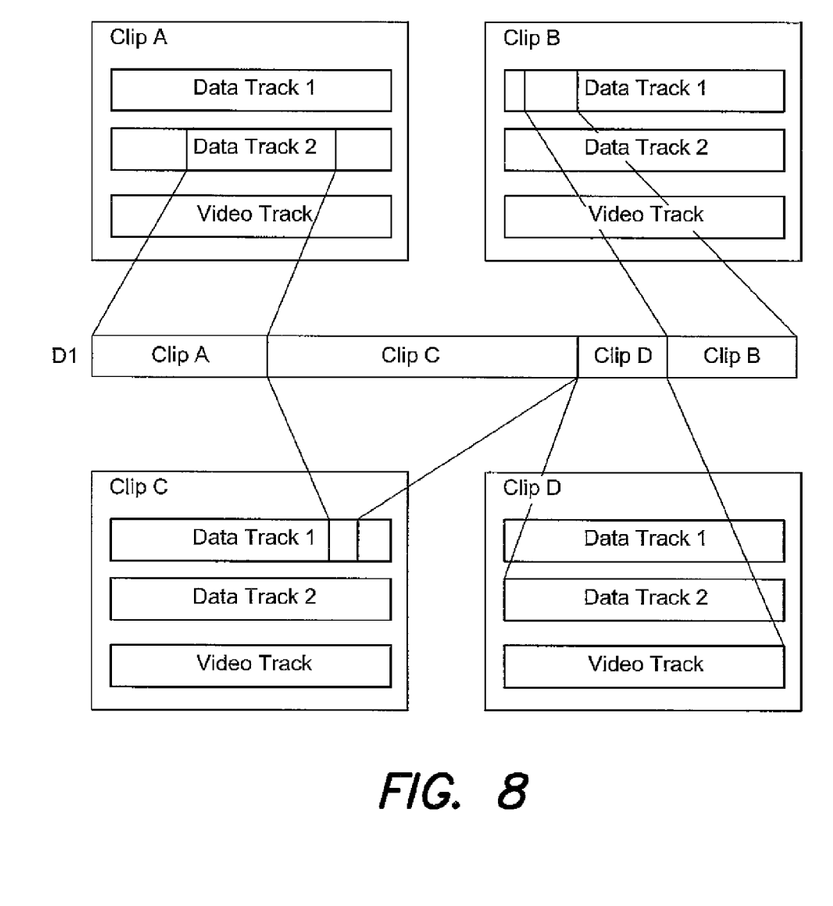
FIG. 8 illustrates a data track having regions originating from regions of tracks in different clips.
Figure 9:
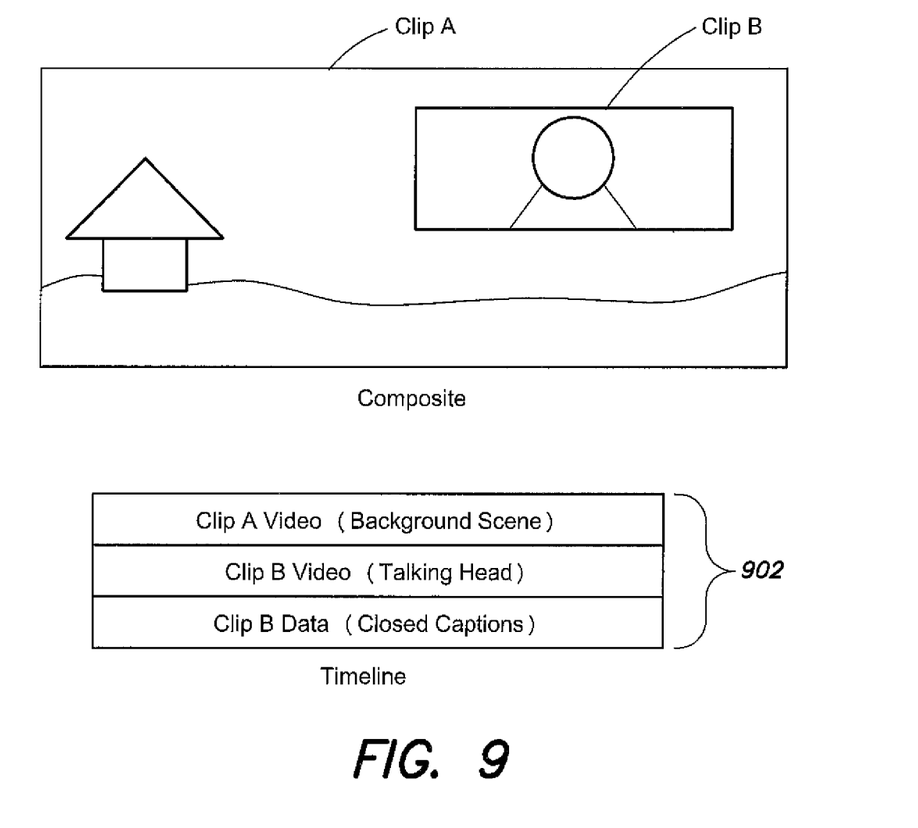
FIG. 9 illustrates an example of data track selection in a picture-in-picture application.

FIG. 8 illustrates how individual edit regions in a data track of a sequence may originate from regions of any of the tracks within a clip or within the sequence. Data track regions may even be included from entirely separate clips that are not included in the sequence. This enables an editor to create any desired sequence of data packets from multiple clips without modifying the original clips, i.e., without performing any temporal editing. In the figure, D1 is a data track in a sequence that has been constructed out of portions of clips A, B, C, and D. FIG. 9 illustrates an application of this feature in which two clips are combined in a timeline. Clip A is used for the background and Clip B is used for a picture-in-picture of a person talking. Both clips have a stream of closed caption data. When the clips are composited together in a sequence, the data stream from only one of the clips, e.g., Clip B, is used, and the data from the other clip, Clip A in this example, is ignored, as illustrated in timeline 902.

Figure 10:
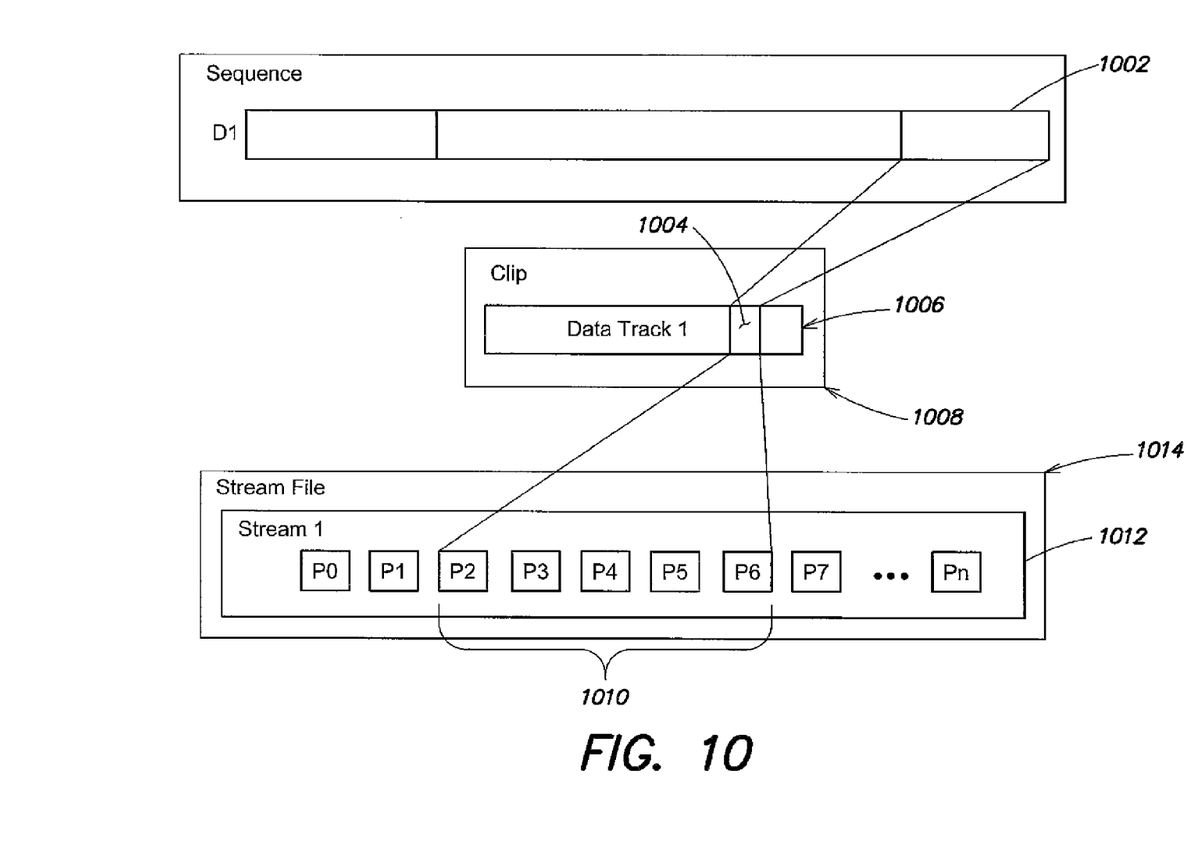
FIG. 10 illustrates the processing of a chain of references to data packets in a media production system.

The digital media production system processes the sequence by following a chain of references beginning with the reference to a temporal span of a data track of the sequence, which points to the clip encapsulating the data, which in turn points to the data packets themselves. Such a chain of references is illustrated in FIG. 10, showing data packet span 1002 in data track D1 referencing portion 1004 of the data track 1006, within clip 1008, which in turn references packets P2-P6 (1010) within stream 1 (1012) of stream file 1014. Sequences, clips, tracks, and data packets may be stored contiguously or in separate locations in memory or disk or other storage systems. In one typical arrangement, sequences, clips, and data packets are stored as separate entities, as illustrated in FIG. 10.

With the described data structure, the digital media processing system is able to perform a number of functions relating to the synchronous data. A fundamental new capability is playback and/or storing of streams of arbitrary data in absolute synchronization with video and audio. The synchronization may be accurate down to the level of individual video frame times. Note, the synchronization extends through each temporal location of the sequence, and is not limited to start/end point synchronization. The structure also permits the data streams to be played or processed from multiple disk files, including files that may be stored in different locations. For example, during the editing of a television program, it is often necessary to use footage from archives that have their own streams of closed captions encoded into files. The described system is able to incorporate these files into the production process with transcoding, re-wrapping, combining, or otherwise converting the stream files, thus speeding up the process of editing data-oriented material in a deadline-driven production environment. In another example, it may be necessary to replace a small portion of the data in a sequence to correct a mistake, such as a misspelled caption or incorrect station branding. The described system may be used to prepare a small stream file containing only the corrected data with a reference to the new file in the original sequence in place of the erroneous data. This approach avoids the need to fully recreate the original data track containing the mistake, which results in a more efficient and faster workflow.

Figure 11:
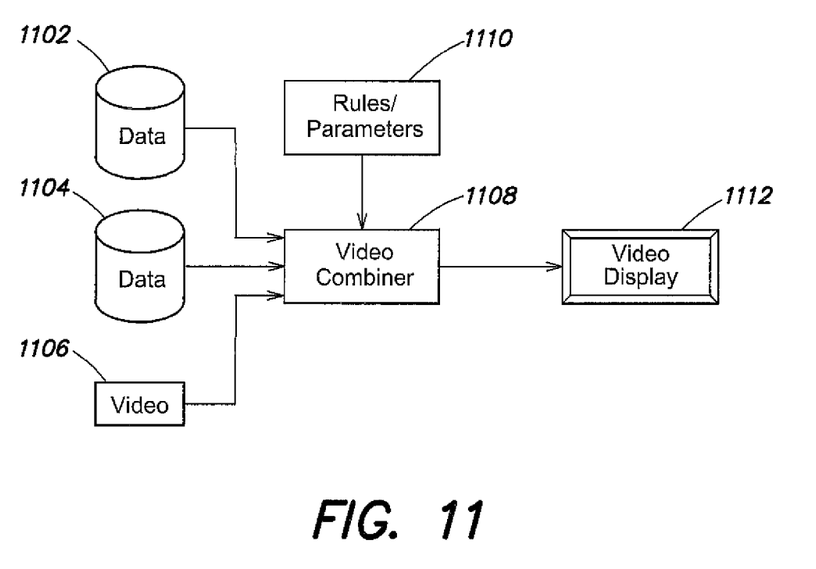
FIG. 11 is a diagram illustrating the combining of data and media tracks for output.

The system is able to combine, filter, and convert the streams of data in real-time or as a non-real-time process. FIG. 11 illustrates combining data tracks 1102, 1104 with video track 1106 using video combiner module 1108 according to rules and/or parameters 1110 for output to video display 1112. The combiner modifies the individual tracks in the process of combining them into a single combined output. For example, a combiner can combine a subtitle data track with a video track, to produce subtitled video. In another example, a combiner uses GPS location data to position a map showing the current location of the camera shot. In a further example, a combiner uses convergence data from a 3D stereo camera rig to dynamically and intelligently modify the depth of 3D video clips. Yet another application is to use a combiner when down-converting a project from HD to SD to read caption data from the data track and insert it as VBI captions on line 21 of the output video.

Figure 12:
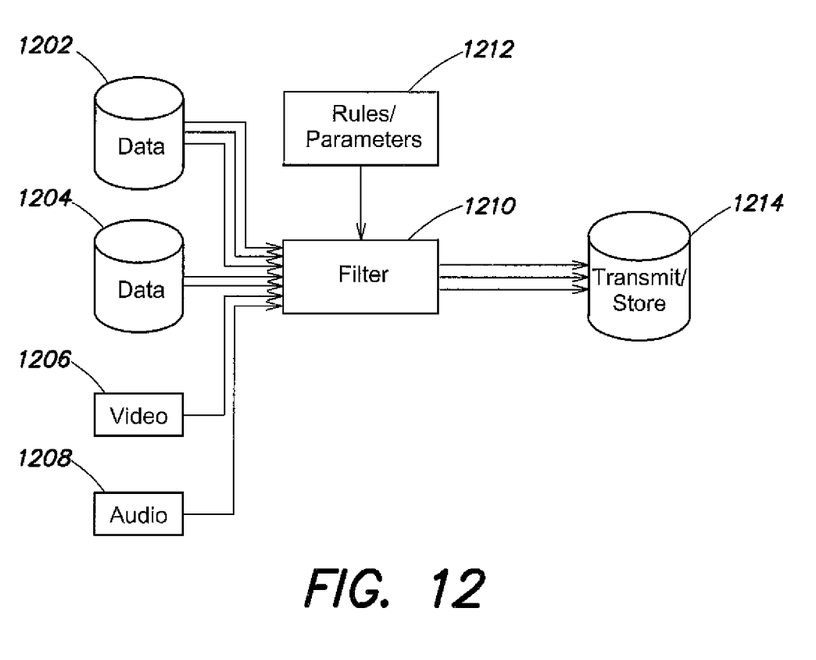
FIG. 12 is diagram illustrating the filtering of data streams and media tracks for onward transmission or storage.

The system also permits a user to filter data according to selected rules and parameters to determine what media and data flows to processes downstream of the media editing system. In the example illustrated in FIG. 12, data tracks 1202 and 1204, video track 1206, and audio track 1208 are input to filter 1210, which filters the incoming media and data according to rules/parameters 1212. Data filtering may be performed within a given data track by filtering individual streams. The filter output is either transmitted onwards, or stored (1214). In contrast to the combinations described above, filtering does not cause the media and data tracks to interact or be mingled. In one use of filtering, a user may wish to output no more than one data stream of a given type. Thus, for example, if data tracks 1202 and 1204 each contain subtitle streams, such as different language versions, filter 1210 may select just one of them for output. On the other hand, individual streams may be selected according to different requirements. Using the example of two different language subtitle streams again, a user may wish to include subtitle data for both languages in a program edition that enables viewers to select which language subtitles they wish to view. In other circumstances, all streams from a given data track may be output. Another example involves using a filter to ensure that all AFD (Advanced Format Descriptor) values in a sequence conform to a desired output aspect ratio. Further filtering examples include: automatically replacing inappropriate words in closed captions for consumption by young audiences; automatically adjusting closed captions when the time-span for presenting them is decreased; and reading GPS coordinates, converting them to a text string descriptive of their location, e.g., by referring to a map database, and inserting the text into a data track as captions or teletext.

Figure 13:
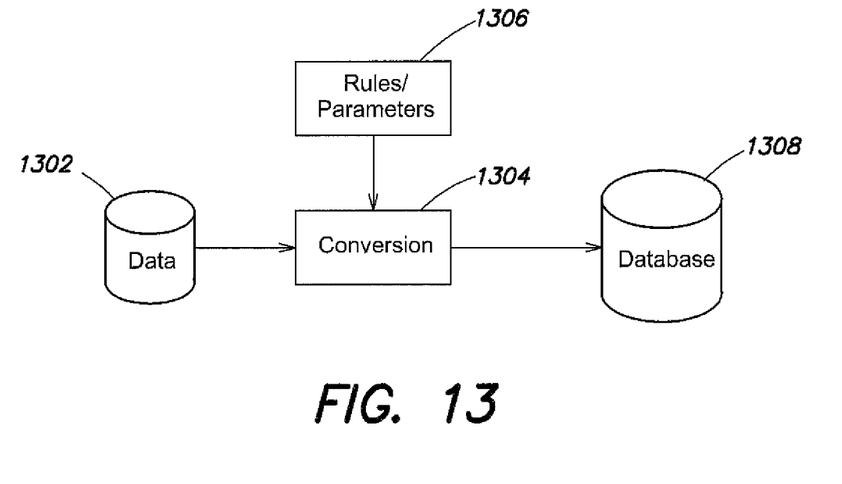
FIG. 13 is diagram illustrating data conversion.

The data may be converted into a form that allows searching or analysis. For example, data may be converted into text and read into a media asset management system, which can then be searched. Searchable data may include closed caption text, program description data, positional data such as GPS coordinates, and interactive program content. For example, a documentary or reality film maker may use GPS location data to search and sort available media based on the locations at which they were shot. FIG. 13 illustrates conversion of data from data track 1302 by conversion module 1304 according to rules 1306, with the result output to database 1308. A typical database entry includes a time field, a value, as well as a reference to the data track from which the data originated.

The data structure described herein permits a digital media production system that includes an interactive non-linear video or audio editing system to also edit and play back data tracks with the same degree of flexibility hitherto available only for media tracks.

Figure 14:
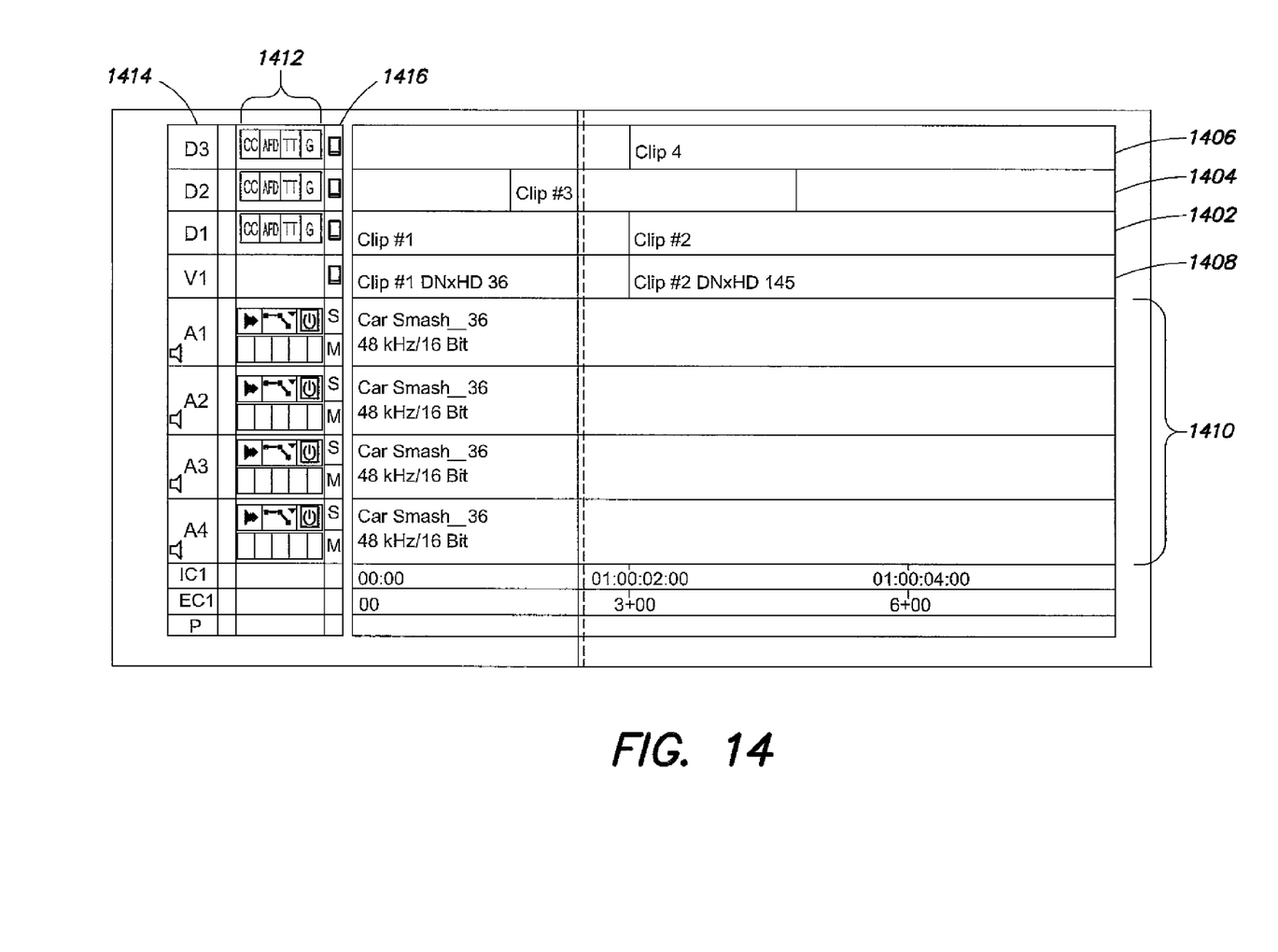
FIG. 14 is a schematic illustration of a graphical user interface for a non-linear digital media editing system including synchronous data tracks.

An example of a graphical user interface for a non-linear editing system in which an editor is able to manipulate multiple data tracks is illustrated in FIG. 14, which is a schematic view of an editing system display showing a timeline representation of a media sequence. Three data tracks D1, D2, D3 (1402, 1404, 1406) are shown at the top of the timeline, together with video track V1 (1408), and four audio tracks A1, A2, A3, and A4 (1410). The indicators/buttons marked CC, AFD, TT, and G (1412) display the types of data that are present in the corresponding track. In this example, CC denotes closed captions, AFD denotes Advanced Format Descriptor, TT denotes teletext, and G denotes GPS positioning data. The user is able to use the basic video editing tools available to edit picture and sounds, such as cut, copy, paste, slide, insert, overwrite, trim. Track selectors 1414 in the left column enable the user to temporarily enable or disable editing operations on the corresponding tracks. Indicator buttons 1412 are also used to selectively enable or disable data playback of each of the data streams in the corresponding data tracks. This feature is especially useful in testing and troubleshooting to help isolate problems. The number of indicator buttons displayed corresponds to the number of streams in the data track. Track selectors 1416 enable the user to select/deselect entire tracks for playback.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, communication device, touch-screen, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic or optical discs, which may include an array of local or network attached discs.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide are network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing a time-based media composition using a media editing software application, wherein the composition includes at least one media track and at least one data track, the method comprising:
    displaying a timeline representing a current state of the media composition, wherein the timeline includes the at least one media track and the at least one data track, wherein the data track references at least one data stream comprising a stream of data packets, wherein each of the data packets occupies a unique time address corresponding to a media element on the media track;
    enabling a user of the media editing software application to perform a first editing operation to the time-based media composition, wherein the first editing operation comprises a media editing operation and is applied to both the at least one media track and the at least one data track, thereby maintaining unaltered a temporal relationship between the at least one media track and the at least one data track; and
    enabling the user of the media editing software application to perform a second editing operation to the media composition, wherein the second editing operation comprises one of a media editing operation applied to the at least one media track and a data editing operation applied to the at least one data track, wherein the data track references at least one data stream comprising a stream of data packets, and wherein a temporal relationship between at least a portion of the at least one media track and the at least one data track is altered by the second editing operation.

2. The method of claim 1, wherein at least one of the first and second editing operations includes moving at least one boundary of a segment of the composition.

3. The method of claim 1, wherein at least one of the first and second editing operations includes altering a temporal location within the composition of a segment of the composition.

4. The method of claim 1, wherein the time-based media composition is a video composition.

5. The method of claim 4, wherein the media element is a video frame.

6. The method of claim 1, wherein the time-based media composition is an audio composition.

7. The method of claim 1, wherein the at least one data track includes a track referencing text data.

8. The method of claim 7, wherein the text data is one of the set consisting of closed captions, open captions, subtitles, and teletext.

9. The method of claim 1, wherein the at least one data track includes a track referencing film metadata.

10. The method of claim 1, wherein the at least one data track includes a track referencing camera data.

11. The method of claim 1, further comprising enabling a user to combine data referenced by at least one data track and at least one media track into a combination media stream, and to output the combination media stream.

12. The method of claim 1, wherein the at least one data track includes a plurality of data streams, further comprising enabling a user to select and output a subset of the plurality of data streams.

13. The method of claim 1, further comprising enabling a user to convert data referenced by the at least one data track into a form that is searchable by a media asset management system, and storing the converted data in a database.

14. A computer program product comprising:
a non-transitory computer-readable medium with computer program instructions encoded thereon, wherein the computer program instructions, when processed by a computer, instruct the computer to perform a method of editing a time-based media composition, wherein the composition includes at least one media track and at least one data track, the method comprising:
displaying a timeline representing a current state of the media composition, wherein the timeline includes the at least one media track and the at least one data track, wherein the data track references at least one data stream comprising a stream of data packets, wherein each of the data packets occupies a unique time address corresponding to a media element on the media track;
enabling a user of the computer to perform a first editing operation to the time-based media composition, wherein the first editing operation comprises a media editing operation and is applied to both the at least one media track and the at least one data track, thereby maintaining unaltered a temporal relationship between the at least one media track and the at least one data track; and
enabling the user of the computer to perform a second editing operation to the media composition, wherein the second editing operation comprises one of a media editing operation is applied to the at least one media track and a data editing operation applied to the at least one data track, wherein the data track references at least one data stream comprising a stream of data packets, and wherein a temporal relationship between at least a portion of the at least one media track and the at least one data track is altered by the second editing operation.

15. A system for editing a time-based media composition, the system comprising:
a memory for storing computer-readable instructions; and
a processor connected to the memory, wherein the processor, when executing the computer-readable instructions, causes the media composition system to perform a method of editing a media composition, wherein the composition includes at least one media track and at least one data track, the method comprising:
displaying a timeline representing a current state of the media composition, wherein the timeline includes the at least one media track and the at least one data track, wherein the data track references at least one data stream comprising a stream of data packets, wherein each of the data packets occupies a unique time address corresponding to a media element on the media track;
enabling a user of the system to perform a first editing operation to the time-based media composition, wherein the first editing operation comprises a media editing operation and is applied to both the at least one media track and the at least one data track, thereby maintaining unaltered a temporal relationship between the at least one media track and the at least one data track; and
enabling the user of the system to perform a second editing operation to the media composition, wherein the second editing operation comprises one of a media editing operation applied to the at least one media track and a data editing operation applied to the at least one data track, wherein the data track references at least one data stream comprising a stream of data packets, and wherein a temporal relationship between at least a portion of the at least one media track and the at least one data track is altered by the second editing operation.

16. A method of editing a media composition using a media editing software application, wherein the media composition includes at least one media track and at least two data tracks, the method comprising:
displaying a timeline representing a current state of the media composition, wherein the timeline includes the at least one media track and the at least two data tracks, wherein each data track references at least one data stream comprising a stream of data packets, wherein each of the data packets occupies a unique time address corresponding to a media element on the media track, and wherein each of the packets within a given stream are characterized by a common data type, and wherein each of a first data track and a second data track includes a data stream of a first data type;
enabling a user of the media editing software application to perform an editing operation to the media composition, wherein the editing operation comprises one of a media editing operation applied to the at least one media track and a data editing operation applied to one or more of the at least two data tracks, and wherein a temporal relationship between at least a portion of the at least one media track and the one or more edited data tracks is altered by the editing operation; and
enabling the user of the media editing software application to select one of the data stream of data packets of the first type from the first data track and the data stream of data packets of the first type from the second data track, wherein the selected data stream is selectively included in at least one of playback or export of the media composition.

* * * * *